US009984151B2

(12) United States Patent
Liu et al.

(10) Patent No.: US 9,984,151 B2
(45) Date of Patent: May 29, 2018

(54) DETERMINING SEARCH RESULTS USING SESSION BASED REFINEMENTS

(71) Applicant: eBay Inc., San Jose, CA (US)

(72) Inventors: Yuanjie Liu, Shanghai (CN); Xiaoyuan Wu, Shanghai (CN); Michael Ching, San Jose, CA (US); Song Feng, Milipitas, CA (US); Joseph Anthony Beynon, Campbell, CA (US); David Goldberg, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 513 days.

(21) Appl. No.: 14/588,290

(22) Filed: Dec. 31, 2014

(65) Prior Publication Data

US 2016/0188659 A1 Jun. 30, 2016

(51) Int. Cl.
*G06F 17/30* (2006.01)
(52) U.S. Cl.
CPC .............. *G06F 17/30646* (2013.01)
(58) Field of Classification Search
USPC ................................ 707/723, 778
See application file for complete search history.

(56) References Cited

U.S. PATENT DOCUMENTS

| | | | | |
|---|---|---|---|---|
| 7,624,047 B1* | 11/2009 | Round | ...................... | G06F 9/50 |
| | | | | 705/26.1 |
| 8,229,926 B2* | 7/2012 | Malik | ............... | G06F 17/30864 |
| | | | | 707/729 |
| 9,298,777 B2* | 3/2016 | Lawrence | ......... | G06F 17/30867 |
| 9,317,584 B2* | 4/2016 | Hueter | ................ | G06F 17/3002 |
| 9,405,772 B2* | 8/2016 | Petrou | ............... | G06F 17/30277 |
| 9,418,118 B2* | 8/2016 | Haveliwala | ....... | G06F 17/30867 |
| 9,430,131 B1* | 8/2016 | Zhang | ................. | G06F 3/04842 |
| 9,547,698 B2* | 1/2017 | Jain | .................... | G06F 17/30554 |
| 2012/0084146 A1* | 4/2012 | Zwicky | .................. | G06Q 30/02 |
| | | | | 705/14.47 |

* cited by examiner

*Primary Examiner* — Kim Nguyen
(74) *Attorney, Agent, or Firm* — Shook, Hardy & Bacon L.L.P.

(57) ABSTRACT

Techniques for determining search results based on session based refinements are presented herein. A method is disclosed that includes receiving a query in a user session, the query comprising one or more search parameters, detecting, in the user session and after receiving the query, a user event associated with a property of an item, updating a record in a table that associates the query with the property, the table comprising a plurality of records that associate the query with respective item properties, the record comprising the query, the property, and a score, and ranking search results for a subsequent query based on the associated properties indicated in the plurality of records, the subsequent query including the one or more search parameters.

18 Claims, 12 Drawing Sheets

DETERMINING SEARCH RESULTS USING SESSION BASED REFINEMENTS

TECHNICAL FIELD

The subject matter disclosed herein generally relates to generating search results in a networked marketplace and more specifically describes determining search results for users using a networked marketplace.

BACKGROUND

Users currently use a wide variety of computing devices to participate in a networked marketplace. Users typically search for a wide variety of items that may or may not be available at the networked marketplace.

In some examples, users may search for very generic terms hoping to find what they are looking for. For example, a user may desire to purchase poker chips and may search for "chips." Because the networked marketplace may include many different kinds or types of "chips," the marketplace may not be able to determine what the user is looking for.

In other examples, a system may present a variety of products that include the term "chips," and may remember items users have clicked. The system may infer that future users are likely looking for similar items. However, because the system may not present the user with a complete spectrum of products based on the search term, the system may suffer from a presentation bias. Therefore, a system developed in this way may still not be able to increase accuracy of search results.

In another example, a system may relate sales with queries. However, because sales represent a very small data sample as compared with item views or selections, the system may not acquire sufficient data to learn what users are likely looking for.

Furthermore, a wide variety of different users may use the networked marketplace and may commonly understand terms to mean distinct things, or may use generic terms intending to purchase different things. Therefore, accommodating a wide variety of very different users may be difficult.

BRIEF DESCRIPTION OF THE DRAWINGS

Some embodiments are illustrated by way of example and not limitation in the figures of the accompanying drawings.

DETAILED DESCRIPTION

Figure 1:
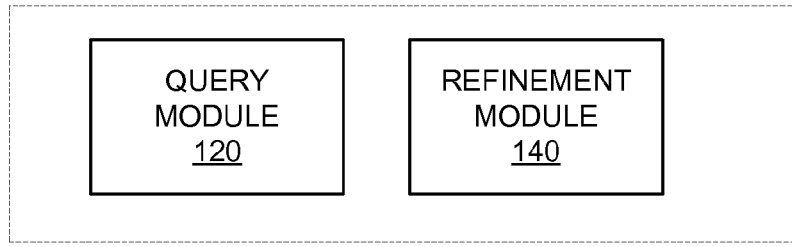
FIG. 1 is a block diagram illustrating a system for determining search results using session based refinements, in accordance with an example embodiment.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example systems and methods for determining search results using session based refinements are described. In general, a query module (FIG. 1: 120) may be configured to receive a query from a user. The query may include limited search parameters where a system may not be able to determine what the user is looking for with much accuracy. Later, in the same user session, the user may refine the query to direct the query more towards what the user is seeking A refinement module 140 (FIG. 1: 140) may be configured to create a refinement that includes an initial query and a property of an item associated with a user event. The refinement module 140 may associate the query with the refinement in a hierarchy of query refinements. In one example, the refinement includes a subset of the search parameters included in the refinement query. In another example, the refinement includes a price range (as determined from items upon which the user has acted).

Furthermore, as a user selects item and/or purchases items the system may conclude that the most recent query included accurate search results. Therefore, in certain example embodiments, the system may generate a refinement and/or increase a score for a refinement based, at least in part, on user events, such as, but not limited to, item views, item selections, item purchases, placing items on a watch list, placing items in a purchase cart, or other user events. The refinements may include any and/or all item parameters. For example, where the user selects red items, the refinements may include the property of being the color red. In another example, where the user purchases items within a price range, the refinement includes the price range of the purchased item.

Over time, as refinements from many users are accumulated in the hierarchy of refinements, the system may automatically refine, without user intervention, an initial query received from a user using the refinements in the hierarchy. Therefore, the system may determine accurate search results for subsequent users although the subsequent user may provide limited search parameters.

In one example, a user may search for "chips." In a user action, the user may select an item that includes "poker chips" in the title. The user may then purchase the item. In response, based on the user's actions, the system may associate a "poker chips" query with a "chips" query. In another example, based on the user's actions, the system may associate a property of the purchased item with the "chips" query. For example, the system may associate a price point, a color, a size, a category, or other item parameters with the initial query of "chips." As an increasing percentage of users refine their queries in this way, a system may assume that a user desires "chips" in a specific price range in response to subsequent users searching for "chips." Therefore, a system may better determine what a user desired using limited search parameters and historical refinements from many users.

FIG. 1 is a block diagram illustrating a system 100 for determining search results using session based refinements, in accordance with an example embodiment. According to this example embodiment, the system 100 includes a query module 120 and a refinement module 140.

In one embodiment, the query module 120 may be configured to receive a query in a user session. As one skilled in the art may appreciate, a query may be received as a text string, binary values, commands, messages, or any other way and this disclosure is not limited in this regard. In one example, the query module 120 may provide an interface for the user to enter a query. In another example embodiment, the query includes one or more search terms and one or more selections by the user. For example, the user may select a category using a checkbox and additionally provide a search term. The query may include these various parameters.

In the same session, after the query, the query module 120 may detect a user event from the user. For example, in response to the initial query not resulting in desired search results, the user may select narrow search parameters. Narrowing search parameters includes the user providing additional search terms, additional selections, or the like, that further restrict search results.

In certain examples, the query may be the first query in a user session and user events are detected after the query in the user session. The query module 120 may associate a property of an item associated with the user event because they were received/detected in the same user session. However, a user may switch from looking at one item to looking for a different item (even in the same session). Because this later query may not include search parameters from any earlier query in this session, the query module 120 may determine that this later query is an initial query. Therefore, an initial query may not be the first query in a user session.

A refinement query, as described herein, at least includes a query that includes one or more search parameters from a previous query in the user session. In one example, the query module 120 may examine previous queries in the user session to distinguish between initial queries and refinement queries. Typically, and as used herein, an initial query is a user's first query targeting a specific item or type of item, whereas a refinement query further limits search results from the initial query. Of course, the refinement query may include refinement selections, refinements search terms, or similar.

In another example embodiment, a different user, at a later time, may also submit a query that is substantially similar to the initial query from the first user. Based on refinements by the first user, the query module 120 may generate search results based on the refinement from the first user.

In one embodiment, the refinement module 140 may create a refinement for each refinement query. A refinement, as described herein, includes at least a portion of a query and a property of an item available at the network-based marketplace. In one example, a refinement may be stored as a data record in a database. In another example, a refinement may be stored as a pair of values where the first value is the query, and the associated value is a category or another property of an item upon which the user acted. Of course, one skilled in the art may recognize other ways to store a refinement and this disclosure is not limited in this regard.

In another embodiment, the refinement module 140 may score the refinement. As will be further described in later paragraphs, scoring a refinement may include counting items selections and/or item sales, counting a number of users that perform a similar refinement, or the like. For example, in response to a user viewing or selecting an item, the refinement module 140 may associate the view with the most recent query and may increase a score for that query. In another example embodiment, the refinement module 140 associates a property of the item viewed with the most recent query. For example, the refinement module 140 may associate the most recent query with the price of the item viewed, a brand, a size, a pattern, a color, or any other property of the viewed item. The refinement module 140 may also increase scores for other queries that include similar search parameters.

In one example, a user may desire to purchase poker chips and may provide an initial query with the search term "chips." In response to the initial query of "chips," the query module 120 may return search results that include poker, potato chips, computer chips, wood chips, CHiPs™ Paraphernalia, or other items that include "chips" in an item title or description. In this example, because the user desired poker chips, the user will not likely want to view results from other categories. However, the user may perform one or more actions on an item that is part of the results.

In response to the user event being received in the same user session, the refinement module 140 may create an association that includes a property of an item associated with the user event in a hierarchy of query refinements as will be described in later paragraphs. Furthermore, because "poker chips" may be in a "gaming" category, the refinement module 140 may include the "gaming" category in the refinement. In another example embodiment, the refinement module 140 may create a record in a table of refinements. The record, according to one example embodiment, includes the initial query, the property of the item, and a score.

In another example embodiment, the refinement module 140 detects in the user session, a user event associated with an item. The refinement module 140 may then associate the initial query with any property of the item. Therefore, in response to a user selecting an item to view, after the initial query of "chips," the refinement module 140, in one embodiment, associates the initial query with a property of the viewed item. In response to receiving a subsequent query that includes "chips," the refinement module may return search results that are limited by the associated parameter of the previously viewed item.

In one example, the color of a viewed item may be red. In response to many users selecting and/or viewing red items after an initial "chips" query, the refinement module may return red items to a subsequent user submitting a "chips" query.

In another example embodiment, the refinement module 140 may associate the initial query of "chips" with a refinement that includes a category associated with "poker chips." For example, the refinement module 140 may associated an initial query of "chips" with a refinement that includes a gaming category. Therefore, in response to a subsequent query that includes "chips," the query module 120 may return search results that include "poker chips," or that are from a gaming category.

Although subsequent queries may be received from any user and/or user session, the initial queries and user events discussed and analyzed herein include queries and events from a single user session. A user session, as used herein, includes a portion of time wherein a user searches for a specific item. In one example embodiment, the session includes a network communication session as one skilled in the art may appreciate. For example, in response to the user closing a web browser and continuing at a different client device, the query module 120 may determine the other computer to be a different session.

In another example embodiment, a user session may include queries from the user without significant amounts of time elapsing. For example, in response to the user submitting additional queries with less than a minute between queries, the queries may all be in the same session. In response to the user not submitting additional queries for a time period such as 30 minutes, the query module 120 may determine that the session has ended. Further queries received from the user after 30 minutes may be deemed to be in a different user session.

In one example embodiment, a user may submit additional queries that include all of the search terms from the initial query and additional search terms. However, the user may then decide to search for a different item and may submit a different query that does not include a search term from the initial query. In response to the additional query not including search terms of the initial query, the query module 120 may determine that the session has ended.

In another example embodiment, the user may, at a later time, return to look for the item originally searched for and may submit an additional query that includes all of the search terms of the initial query and at least one additional search term. In response, the query module 120 may determine that the user is continuing a prior search and may expand the user session to include the initial query and the additional query. Therefore, in certain embodiments, the user session may include disparate time periods.

In one example embodiment, an additional query may further refine another query. For example, a user may submit an initial query using the search term "car." The user may further refine the search by submitting an additional query that includes "red car." The user may further refine the search by submitting an additional query that includes "red sports car." A property of resulting items may include the items being "red." The refinement module, in this example, may then generate a refinement that associates "car" with "red" (a property of an item for a later query). The user may further refine the search by submitting an additional query that includes "red sports car Porsche." In this example, because the query includes the search term "Porsche," a property of items associated with this query may include the Porsche brand and the refinement module 140 may associated the initial query "car" with the Porsche brand in the hierarchy of query refinements.

According to this example embodiment, the refinement module 140 may associate the "red car" refinement query with the "car" initial query. Furthermore, the refinement module 140 may associate a refinement that includes the refinement query "red sports car" with the earlier query "red car." In certain embodiments, the refinement may not include all of the search terms for the refinement query.

Additionally, the refinement module 140 may associate "red sports car Porsche" with any and/or all of the earlier queries. In response to a subsequent user requesting search results for "red sports car," the query module 120 may return results based on the refinement query "red sports car Porsche." As the query module 120 receives more queries and refinements from users, the resulting hierarchy of refinements may indicate other associations not contemplated by one skilled in the art; this disclosure is not limited regarding the number and/or type of associations stored in the hierarchy of refinements.

In another example embodiment, the refinement module 140 may refresh the hierarchy of refinements. For example, the refinement module 140 may periodically delete refinements in the hierarchy at some regular time interval. For example, the refinement module 140 may delete the hierarchy of refinements on a weekly basis, monthly basis, or other time interval. In certain embodiments, a refresh time for the hierarchy may be based on a number of refinements stored in the hierarchy. For example, in response to the hierarchy storing more than one million refinements, the refinement module 140 may clear the hierarchy and prepare it for new refinements. Periodically refreshing the hierarchy of refinements may help ensure that the refinements accurately reflect current trends, fads, or other temporary factors.

According to another embodiment, the refinement module 140 may be configured to store a score for the respective refinements associated with a query. For example, the hierarchy of query refinements may be stored in a table of refinements. For example, each refinement may be a record in the table, where each record includes the query, the property of the item, and the score.

The score may be based on a variety of actions by a user. For example, the score may be based on item selection, item sales, item inquiries, item views, placing the item on a watch list, placing the item in a virtual shopping cart, other user events, or the like. The score may score a property of an item associated with the initial query. For example, in response to an initial query, the user may not select or view many items. However, in response to a refinement query, the user may select or view many items, such as five, for example. Therefore, due to an increased number of selections of views by the user, and based on the refinement query, the refinement module 140 may score the resulting refinement as a five (one for each view or selection). Furthermore, the refinement module 140 may associate the initial query with any and/or all properties of items associated with the user events. Therefore, where the viewed items share similar properties, the similar properties will have a higher score in the hierarchy (because more events are associated with the item property). In another embodiment, the refinement module 140 uses a higher score for some events then for others. For example, the score associated with a purchase may be higher than a score associated with an item view.

In another example embodiment, the refinement module 140 may further associate the initial query with a refinement that includes a category for the refinement query. For example, the refinement module 140 may increase a score for a category of items selected by the user based on user actions for the items in the category.

In a further example embodiment, the query module 120 may ignore or selections by a user that occur in rapid succession. For example, where a user selects an item many times in a second, the query module 120 may determine that the user is not selecting the items out of interest, but due to some other factor. Therefore, in response to more than one selection in a given period of time, the query module 120 may restrict the selections to one selection. In one example, a server of information may be operating slower than usual and the user may select an item for viewing many times until the item is shown. In response, the query module 120 may indicate one selection although the user selected the item many times. In another example, an automated item selection system may select an item more rapidly that a human user would. In response to two or more selections occurring in the same second of time, the query module 120 may ignore selections above two in one second.

In another example embodiment, the refinement module 140 may score an association based, at least in part, on sales made. For example, the query module 120 may receive an initial query from the user, but may not detect any sales in response to the query. In response to a refinement query, the query module 120 may associate the initial query with a property of the item sold. In response, the refinement module 140 may increase a score for the refinement based, at least in part, on the item sale. For example, the refinement module 140 may increase a score for the refinement by 10 for each sale that occurred after the refinement query. Over time, as users submit queries and purchase items, the hierarchy of refinements will store higher scores for refinements that result in sales.

In another example embodiment, the refinement module 140 may use one or more equations for scoring a refinement. In one example, in response to a user event such as selecting an item, purchasing an item, adding an item to a watch list, etc., the query module 120 may inspect previous queries in the user session. In response to each previous query that matches one or more terms in the most recent query, the query module 120 may generate a data record for the query. The data record, in this example, stores the query, a category of the query, and/or the user event. Therefore, the query module 120 may determine a count of user events for each associated query (e.g., a query that shared one or more search terms with the latest query). In one example embodiment, the query module 120 may count view events and determine how many view events in a user session apply to each previous query.

The refinement module 140 may then score each refinement that includes a previous query category combination, resulting in a score for categories, or other item properties associated with an initial query. In one example, an earliest query that includes one or more searched terms in the latest refinement query may be the initial query. By scoring each category related to a user event, the refinement module 140 may thereby indicate a highest scoring category associated with an initial query. Therefore, in response to a subsequent query that is substantially similar to the initial query, the query module 120 may determine search results based on the highest scoring refinement in the hierarchy of refinements.

In another scoring example, the refinement module 140 may score each refinement as described in Eq. 1.

$$\text{score}=w(n)*(\text{sale count})+(1+w(n))*(\text{view count}) \quad \text{Eq. 1}$$

where $$w(n)=1-2^{(-n/H)} \quad \text{Eq. 2}$$

where n is a number of sales for the current query (i.e., the query in the current refinement being scored), and H is a constant value. Therefore, in this example, a score for an associated refinement may increase as a number of sales increases, or as a number of views increases or other user events based on the refinement. Of course, other constant values may be used, other equations may be used, and this disclosure is not limited in this regard. In one example embodiment, constant values (e.g. H) may be received from a user.

In one example embodiment, in response to receiving a query from a user, the query module 120 may traverse the hierarchy of refinements and generate search results based on a refinement with the highest score. In another example embodiment, the refinement module 140 may determine percentage values for each of the refinements associated with the initial query. For example, the refinement module 140 may sum scores for the associated refinements and then divide the scores for each of the refinements by the sum value resulting in a percentage value for each of the refinements.

In response to receiving a query that is substantially similar to an initial query, the query module 120 may generate search results based on the many refinement in percentages similar to those in the hierarchy of refinements. For example, where the hierarchy of refinement indicates 40% of users refined their queries for brand A, and 60% of users refined their queries using brand B, the query module 120 may generate search results that include 40% of search results based on the refinement that included brand A and 60% of search results based on the refinement that included brand B.

In certain embodiments, a refinement query may not include terms that are exactly like terms in the initial query. For example, the refinement query may include misspelled words that, when corrected, match terms in a previous query. For example, the query module 120 may determine that a query that includes "poker chps" is a refinement query to a previous query that included "chips" although "chps" and "chips" are not identical terms. Furthermore, the query module 120 may reduce many search terms to an acronym and compare the acronym to previous search terms, or alter capitalization of search terms. As one skilled in the art may appreciate, a search term may be altered, corrected, or the like, and the associations stored in the hierarchy of refinements are not limited to exactly matching terms. As used herein, "substantially similar" may include search terms that include such discrepancies. Furthermore, substantially similar may include terms that may be machine corrected to match previous search terms.

Figure 4:
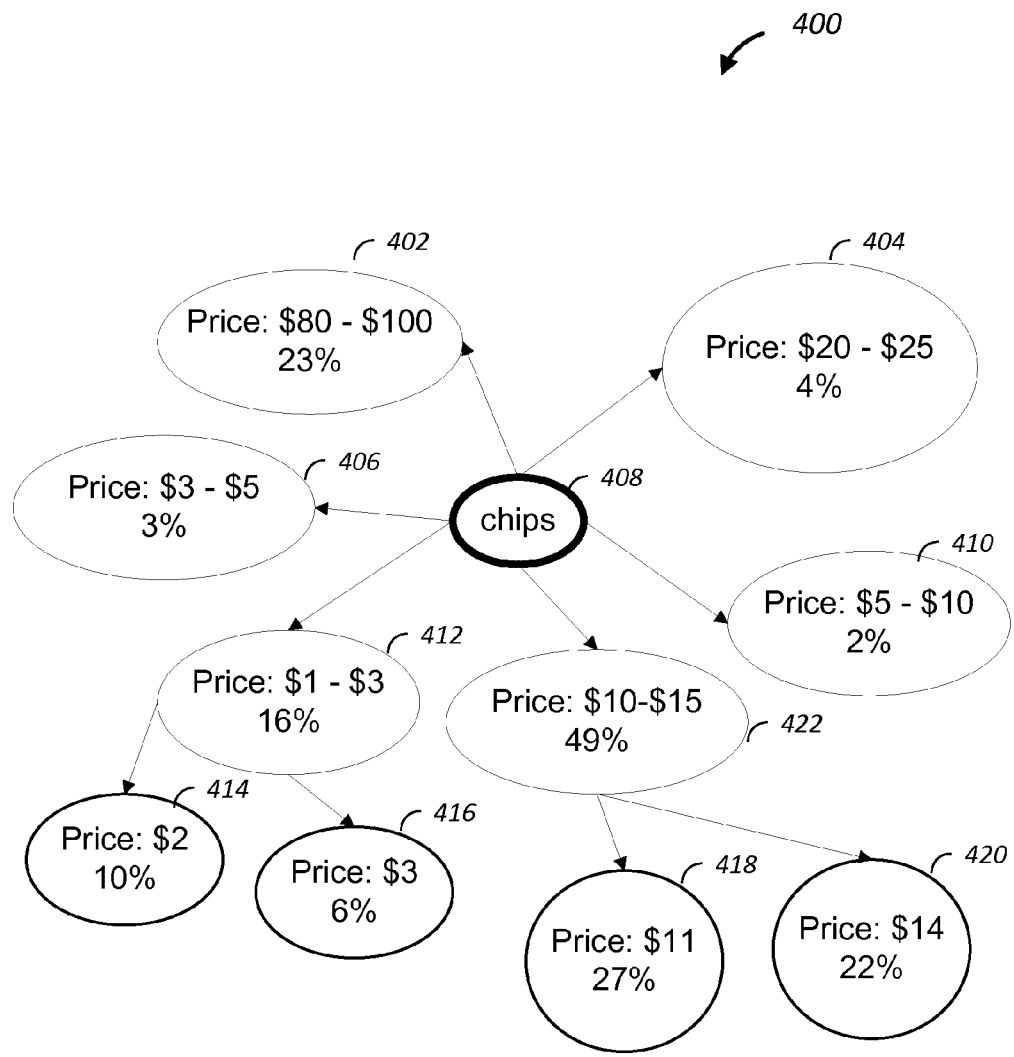
FIG. 4 is a diagram illustrating a hierarchy of query refinements, in accordance with an example embodiment.
Figure 5:
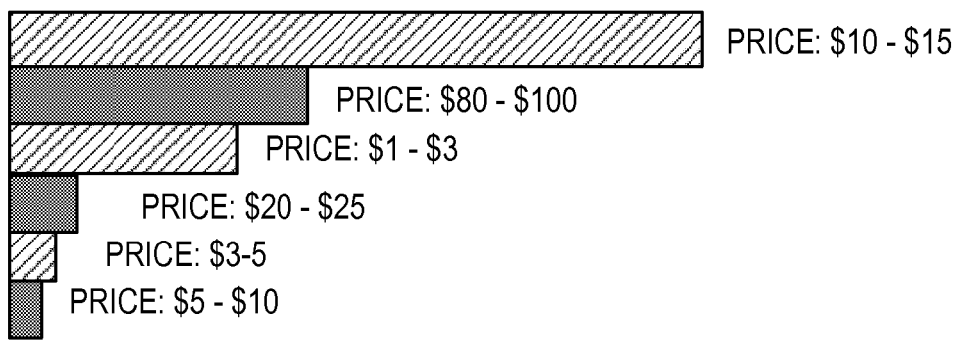
FIG. 5 is a diagram illustrating a list of query refinements, in accordance with an example embodiment.
Figure 6:
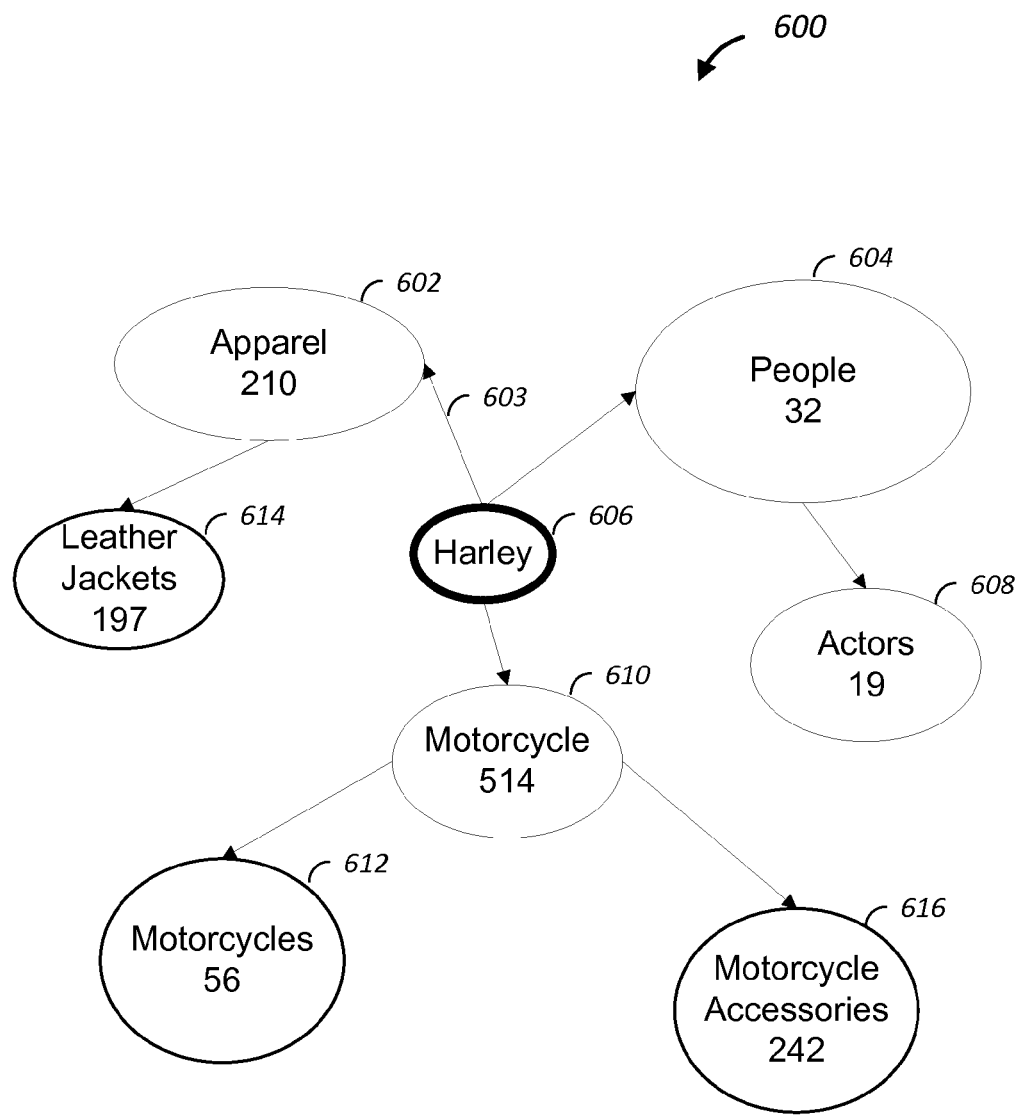
FIG. 6 is a diagram illustrating a hierarchy of query refinements, in accordance with an example embodiment.
Figure 7:
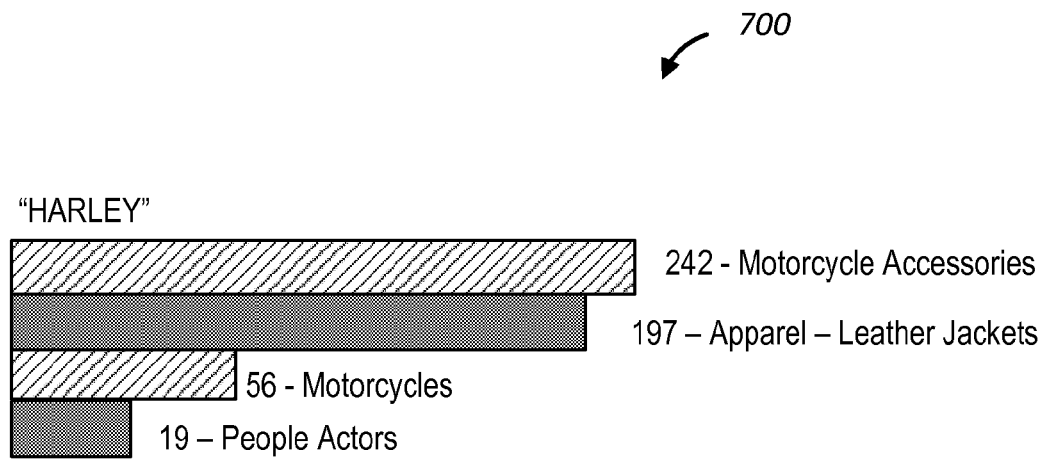
FIG. 7 is a diagram illustrating a list of query refinements, in accordance with an example embodiment.

In one example embodiment, the hierarchy of refinement queries may include a root node for the initial query, and child node for each of the refinements as depicted in FIG. 4 and FIG. 6. In another example embodiment, the hierarchy of refinements may include a list of refinements sorted according to the score, as depicted in FIG. 5 and FIG. 7.

As one skilled in the art may appreciate, a hierarchy of refinements may be stored in a wide variety of formats. In one example embodiment, various nodes may be stored as database records where each record includes the query, a category, a score, and an index value to a connected node. In another example embodiment, various nodes may be stored as an array of data values with an associated pointer pointing to a parent node.

In another example embodiment, the refinement module 140 may create distinct hierarchies for different classes of users. The classes of users may include religion, culture, gender, geographic location, age, or other, or the like. Because different classes of users may understand search terms to mean different things, maintaining separate hierarchies for different classes of people may help ensure consistent associations in the hierarchy of refinements.

For example, a user who is not a Christian may understand a "cross" to mean something different than a user who is a Christian. In another example, because dogs may still be food for humans in some regions of China, a user who is Chinese may understand "dog food" to mean something different than an American (where dogs are not generally consumed by users). In another example, a male user may understand a diaphragm to be a sheet of semi-flexible material anchored at a periphery while a female user may understand a diaphragm to be a contraceptive device. In one further example, a user in America may understand a "football" to be different from a user in Germany, who may interpret a "football" to mean a "soccer ball." Therefore, maintaining different hierarchies of refinements for different classes of users may increase accuracy and consistency for associated refinements.

In one example embodiment, the query module 120 may determine a class of the user based on profile information for the user and store refinements from the user in the determined class. For example, a user profile at the networked marketplace may indicate a race, gender, religion, or other information the query module 120 may use to classify the user.

Figure 2:
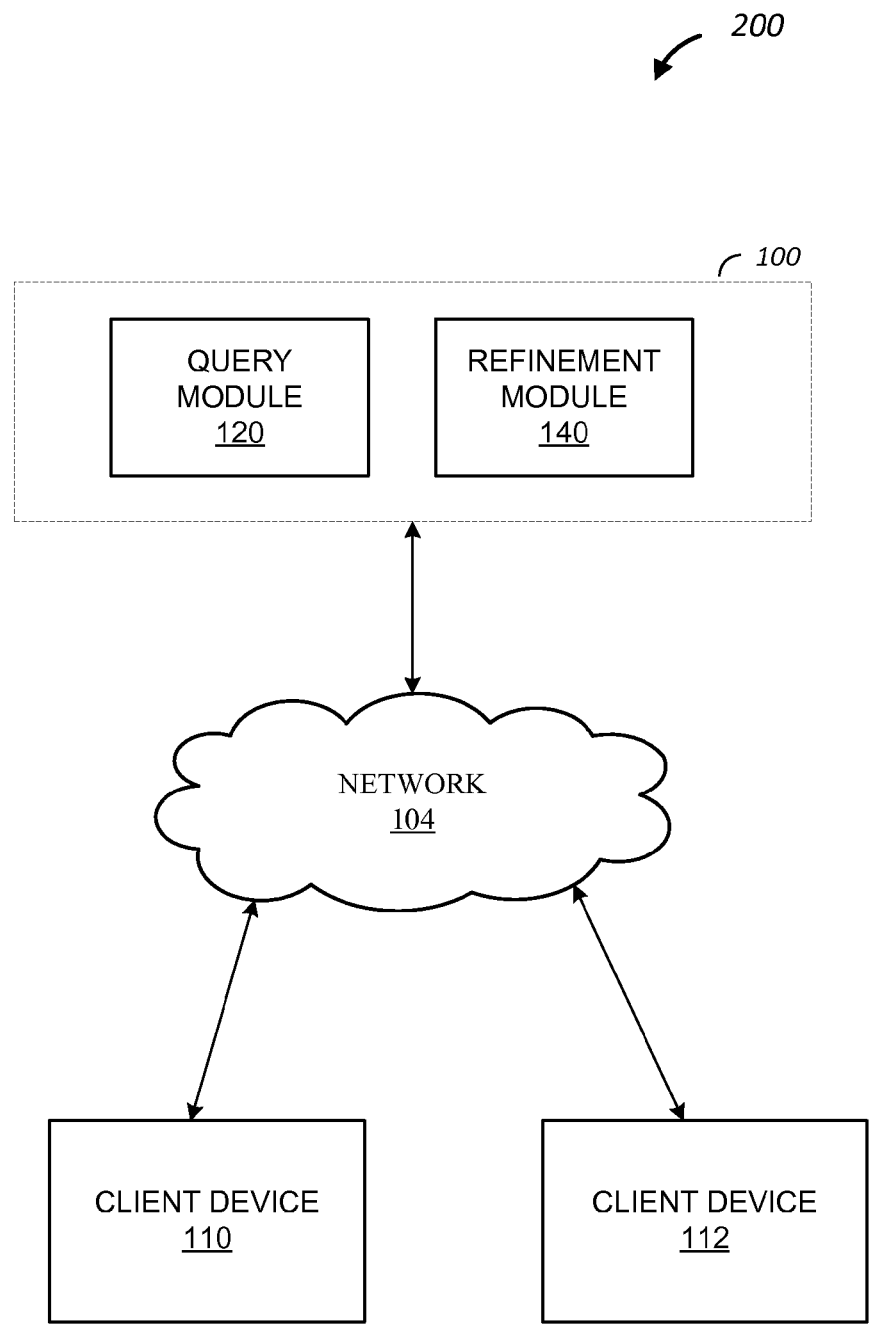
FIG. 2 is a block diagram illustrating a system for determining search results using session based refinements, in accordance with an example embodiment.

FIG. 2 is a block diagram illustrating a system 200 for determining search results using session based refinements, in accordance with an example embodiment. In one example embodiment, the system 200 may include the query module 120, the refinement module 140, a network 104, a client device 110, and a client device 112. The query module 120 and the refinement module 140 may or may or may not be substantially similar to those depicted in FIG. 1.

In one example embodiment, the system 200 may include client devices 110, 112 for communicating with the query module 120 and/or the refinement module 140. The client devices 110, 112 may provide an interface for a user to communicate with the query module 120 and/or the refinement module 140 operating as part of a networked marketplace. The client devices 110, 112 may transmit queries, selection, and/or user events to the query module 120.

In one example, the query module 120 may receive an initial query from a user operating at client device 110. After receiving results from the initial query, the user may authenticate with the query module 120 using the client device 112 and may provide a refinement query using client device 112. Therefore, although one skilled in the art may understand a network "session" to include a specific instance of a connection between a client device 110, 112 and the system 200, a "user session" as used herein may also include communications from the same user at distinct client devices 110, 112. Therefore, although the user communicates with the query module 120 using two different client devices 110, 112, the query module 120 may determine that the queries are in the same user session because the same user used both devices.

In another example embodiment, different users may interface with the query module 120 via their respective client devices. For example, a first user may communicate with the query module 120 using the client device 110 and a second user may communicate with the query module 120 using the client device 112. The refinement module 140 may create a refinement for an initial query received from the first user at client device 110. In response to receiving a second query from the second user at client device 112 that is substantially similar to the initial query from the first user, the query module 120 may generate search results based on the created refinement. In another example embodiment, the query module 120 may operate as a web server and may interface with a user through a web based application operating at the client devices 110, 112.

In certain example embodiments, the network 104 may include any network transmission medium, network protocol, or other, or the like. Of course, one skilled in the art may recognize a wide variety of different networks that may be used to communicate between a client device 110, 112 and the system 200 and this disclosure is not limited in this regard. In a specific example, the network 104 is the Internet.

Figure 3:
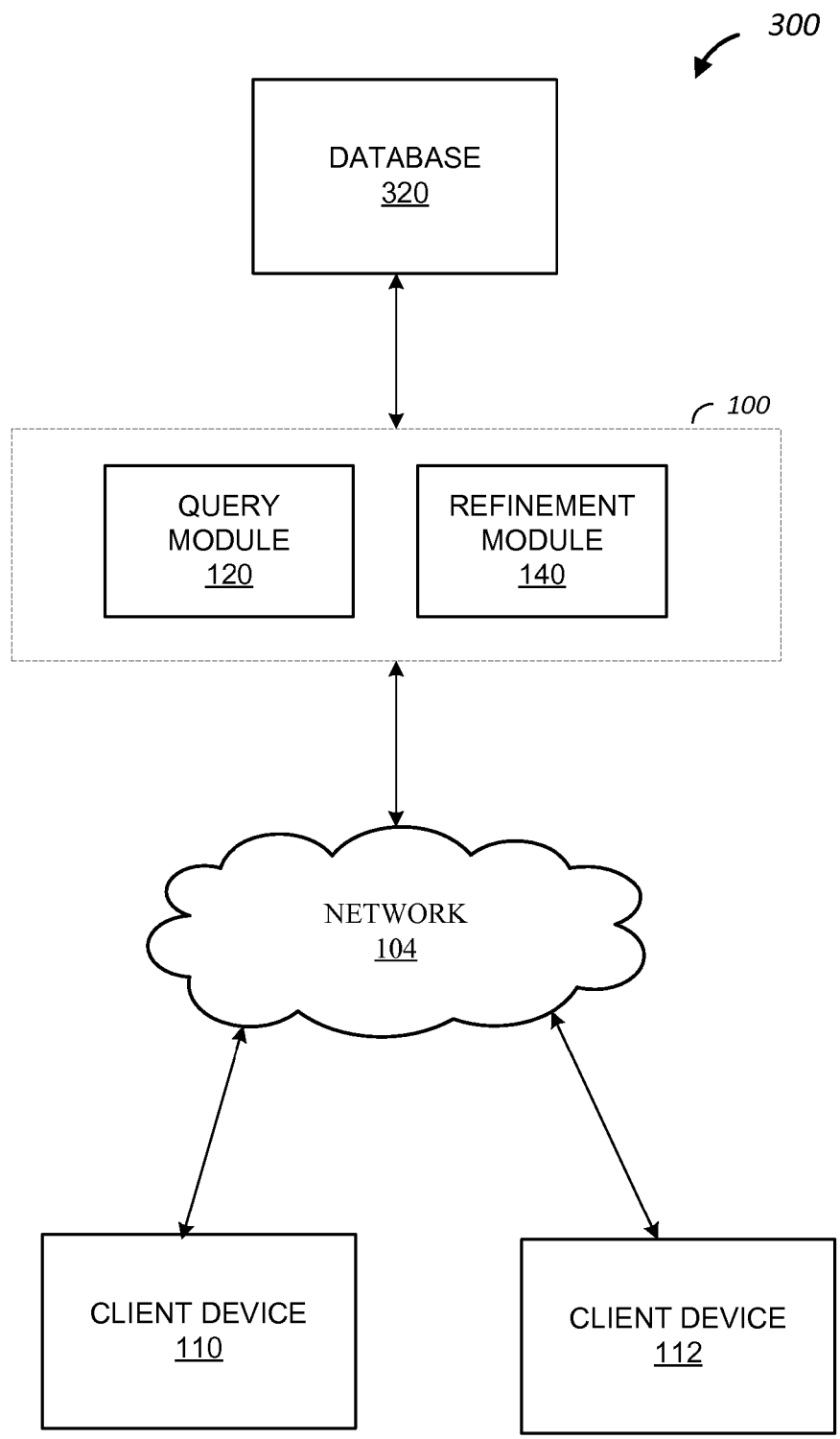
FIG. 3 is a block diagram illustrating a system for determining search results using session based refinements, in accordance with an example embodiment.

FIG. 3 is a block diagram illustrating a system 300 for determining search results using session based refinements, in accordance with an example embodiment. In one example embodiment, the system 300 may include a database 320, the query module 120, the refinement module 140, the network 104, the client device 110, and the client device 112. The query module 120, the refinement module 140, the network 104, the client device 110 and the client device 112 may or may not be substantially similar to those depicted in FIG. 2.

In one example embodiment, the refinement module 140 may store respective query refinements in the database 320, as records in a table. The refinement module 140 may store and and/or all user events in the database 320. For example, the refinement module 140 may store user selection counts, user sale counts, other user events, records associating user events with queries, or other user events described herein, or the like. Furthermore, the refinement module 140 may store scores, weight values, constant values for equations (e.g. Eq. 1 and/or Eq. 2), other values, or the like. Furthermore, the refinement module 140 may store the hierarchy of refinements as data records in the database 320 as previously described. Of course, one skilled in the art may recognize other values that may be stored in the database 320 and this disclosure is not limited in this regard.

In another example embodiment, the query module 120 may store queries submitted by a user. In one example, the database 320 may be operated locally to the query module 120. In another example, the database 320 may be operated remote with the query module 120 and/or the refinement module 140 communicating with the database 320 over a network connection. Various queries may be stored locally, in the database 320, or elsewhere as one skilled in the art may appreciate. Storing queries from a user may allow the query module 120 to analyze previous queries in response to a user event to determine an initial query to associate with a property of an item.

FIG. 4 is a diagram illustrating a hierarchy 400 of refinements, in accordance with an example embodiment. According to this example embodiment, the query module 120 may receive, from many different users, an initial query 408 that includes the search term "chips." The query module 120 may determine that "chips" is the initial query as previously described.

In many distinct examples, the query module 120 may receive user events from different users that include an item. The refinement module 140 may create refinements 402, 404, 406, 410, 412, 422 for respective item properties. In this example embodiment of a hierarchy 400 of refinements, the refinements are associated with a price range for the items associated with the user events. For example, 23% of users acted upon an item with a price range of $80 to $100, 4% of users acted upon an item with a price range of $20 to $25, 3% of users acted upon an item with a price range of $3 to $5, 2% of users acted upon an item with a price range of $5 to $10, 16% of users acted upon an item with a price range of $1 to $3, and 49% of users acted upon a price range of $10 to $15. Of course, each price range may include many different items, however, statistically, the respective price ranges indicated specific item groupings and/or categories.

As depicted in the refinement query 402, the refinement stored in the hierarchy of refinements may not include all of the search parameters in the query. For example, the refinement module 140 may include the additional search terms. In one example, the refinement 402 created from the user selecting an item with a price range of $80 to $100 may simply include an additional search term, such as, "price: 80-100." Because the refinement 402 is associated with the initial query 408, all of the search terms are included in the association (either in the initial query, or the refinement). Therefore, storing all of the search terms of the initial query may not be necessary.

Furthermore, the query module 120 may determine additional refinements 414, 416, 418, 420 for refinements 402, 406, 412, 422, 410, and 404. Links between various queries may be determined based on a temporal relationship between the queries and common search terms as previously described. For example, where the refinement 402 created from the refinement query "computer chips" was received after the "chips" initial query 408 and contained at least one common search term, the query module 120 may determine that the "computer chips" query is a refinement, and the refinement module 140 adds the "computer" refinement 402 as a child node of the "chips" initial query 408. The refinement module 140 may associate the initial "chips" query 408 with a property of an item returned in response to the "computer chips" query. In this example, the property of the item is a price range of between $80 and $100.

As depicted in FIG. 4, the query module 120 may receive additional refinement queries 414,416 for the refinement 412. Based on the query module 120 determining that the refinements 414, 416 are additional refinements of the refinement 412, the refinement module 140 may add the refinements 414, 416 into the hierarchy 400 of query refinements by adding a child node in the hierarchy as depicted in FIG. 4. The additional refinement 414, in this example, includes a price of $2 for the refinement 414 and a price of $3 for refinement 416. Therefore, the hierarchy of query refinements 400 may include many levels of nodes, to store a wide variety of different refinements and how they are associated with an initial query 408.

In another example embodiment, the refinement module 140 may generate percentage values for the various refinements. For example, in response to 46 of 200 users refining an initial query 408 to include items with a price range of between $80 and $100, the refinement module 140 may determine a percentage value of 23%. The refinement module 140 may similarly determine percentage values for each of the refinements resulting in percentage values of 3% for refinement 406, 16% for refinement 412, 49% for refinement 422, 2% for refinement 410, and 4% for refinement 404. Of course, the percentage values are not limited to integer values and this disclosure includes any value.

In one example embodiment, the refinement module 140 may determine percentage values that equal 100% for each node level. For example, the refinements 402, 404, 406, 410, 412, 422 may sum to be 100%. In another embodiment, the 100% may be distributed based on refinements 402, 404, 406, 410, 414, 416, 418, and 420 that are leaf nodes (i.e. nodes with no child nodes) of the hierarchy 400 of refinements. For example, the leaf nodes of refinements 402, 404, 406, 410, 414, 416, 418, and 420 may sum to be 100%. Of course, this is not necessarily the case, as the refinement module 140 may not consider leaf nodes with a query count that is less than a threshold amount. For example, a threshold amount may be 5% and the refinement module 140 may not include the refinement 410 in the percentage calculations.

In another example embodiment, the query module 120 may not add a refinement to the hierarchy 400 of refinements in response to a number of users submitting the query refinement being below a threshold number. For example, the refinement module 140 may wait until the refinement has been received from five or more users before adding the refinement to the hierarchy 400 of query refinements. The query module 120 may still store the queries in the database 320 in a reserve area until the threshold number is reached. This may prevent some refinements from skewing the hierarchy data until the refinement represents more than a single user.

In another example embodiment, in response to a subsequent query, the query module 120 may generate search results that are consistent with the percentage values in the hierarchy of query refinements 400. For example, the query module 120 may receive a subsequent query including the search term "Chips." Because the search term is substantially similar to the search terms in the initial query 408, the query module 120 may generate search results based on the associated refinements. For example, the query module 120 may generate search results wherein 49% of the search results include items with a price range of between $10 and $15, 16% of the results include items with a price range of between $1 and $3, etc.

In another example embodiment, the percentage values may be determined in response to a user event. In one example, the refinement module 140 may add a refinement to the hierarchy of refinements 400 after a sale has occurred. In response, the refinement module 140 may retrace previous refinements by the user and add each refinement to the hierarchy of refinements 400 as previously described.

FIG. 5 is a diagram illustrating a list 500 of refinements, in accordance with an example embodiment. According to this example embodiment, a hierarchy of refinements 400 may be represented as a list of refinements. The list may be ordered based on a score for the refinements and/or a percentage value for the refinements. As depicted in FIG. 5, the list 500 represents the percentage values in FIG. 4.

In one example embodiment, the query module 120 may generate search results based on the refinements in percentages similar to those in the list 500 of query refinements of FIG. 5. For example, where 49% of the refinements associated with "chips" includes items with a price range of between $10 and $15, 49% of the search results based on "chips" alone may include the price range property as described herein. Furthermore, because 23% of the refinements included items with a price range of between $80 and $100, 23% of the search results may include items with a price range of between $80 and $100. This is similarly the case with other refinements depicted in FIG. 5. Therefore, as percentage values change over time (i.e., as the refinement module 140 updates the hierarchy of refinements 400), search results having search terms that are substantially similar to those of an initial query may include search results based on the associated refinements in similar percentages.

FIG. 6 is a diagram illustrating a hierarchy 600 of refinements, in accordance with an example embodiment. According to this example embodiment, the query module 120 may receive an initial query 606 that includes the search term "Harley." After the initial query 606 is received, the query module 120 may receive a refinement query such as, but not limited to, "Harley motorcycle," "Harley poster," "Hank Harley," "Harley Jacket," or other.

In response to the refinement query, the refinement module 140 may determine a category for the refinement based on the search terms. For example, because a "Harley jacket" may be in an apparel category, the refinement module 140 may create an association 603 in the hierarchy 600 associating the initial query 606 with the refinement 602 that includes the apparel category. Furthermore, because "Hank Harley" may be an actor, the refinement module 140 may create a link associating the initial query 606 with the refinement 604 that includes the people category. In another example embodiment, a refinement may already exist in the hierarchy 600 of refinements and the refinement module 140 may increase a score for the refinement.

In one example embodiment, the query module 120 may receive a refinement that includes a refinement query including search terms "Harley leather jacket." In response to receiving search results that include Harley leather jackets, the user may select one to view or purchase. In response to the user event (e.g., viewing or purchasing), the refinement module 140 may increase an event count for each earlier query that includes search terms of the refinement query. For example, in response to the user viewing a Harley leather jacket, the refinement module 140 increase a view count for refinements that include the Leather Jackets category 614, and the apparel category 602.

As illustrated in FIG. 6, as a result of at least 32 users refining an initial query 606 of "Harley" to a query that includes a person, the hierarchy of refinements 600 may store a value of 32 in the refinement 604 for the people category. In another example, in response to a user viewing at least 32 items after refining a search from "Harley" to "Hank Harley," the refinement module 140 may store a value of 32 in the refinement 604 associated with the people category. In one example, in response to users purchasing one or more items after refining a "Harley" initial query 606 to include "Harley Motorcycle" (refinement 610), the refinement module 140 calculates a score for the refinement based, at least in part, on user views, user sales, or the like, as described herein.

FIG. 7 is a diagram illustrating a list 700 of query refinements, in accordance with an example embodiment. According to this example embodiment, the hierarchy 600 of refinements may be represented as a list 700 of refinements. The list 700 of refinements may be ordered based on a score for the refinements as described herein. As depicted in FIG. 7, the list 700 represents the scores of the refinements in the hierarchy 600 of refinements in FIG. 6.

In one example embodiment, the list 700 of refinements may represent ordered scores for the categories represented by leaf nodes (i.e. refinements) in the hierarchy 600 of refinements. Of course, this disclosure is not limited in this regard. In certain embodiments, the list 700 of refinements may depict categories in different node levels in the hierarchy of refinements 600. For example, the list 700 of refinements may include refinements 616, 612 and 614. Therefore, in certain embodiments, the refinements 608-616 represented in the list 700 of refinements 700 may not necessarily be the same number of levels from the parent node of the initial query 606.

In response to a subsequent query, the query module 120 may generate search results from the category with the highest score. For example, in response to a query from another user that includes "Harley," the query module 120 may generate search results selected using the search term 'Harley' and from the refinement 616 that includes the "Motorcycle Accessories" category, because the "Motorcycle Accessories" category may be included in the refinement with the highest score.

Figure 8:
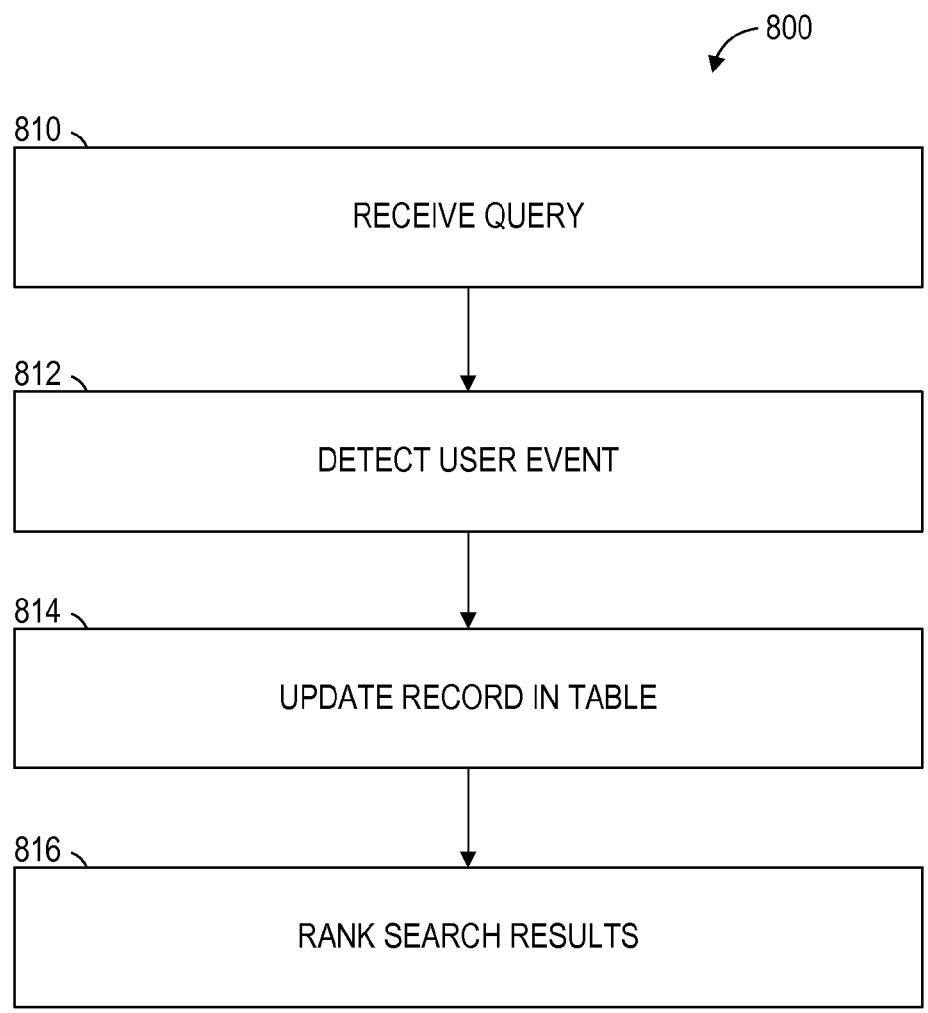
FIG. 8 is a block diagram illustrating a method for determining search results using session based refinements, in accordance with an example embodiment.

FIG. 8 is an illustration depicting a method 800 determining search results using session based refinements, in accordance with an example embodiment. Operations in the method 800 may be performed by the system 100, using modules described above with respect to FIGS. 1-3. As shown in FIG. 8, the method 800 includes operations 810, 812, 814, and 816.

In one embodiment, the method 800 may begin and at operation 810 the query module 120 may receive a query in a user session. The query may or may not be an initial query. The method 800 may continue at operation 812 and the refinement module 120 may detect a user event associated with a property of an item. The user event may be received in the same user session as the initial query.

The method 800 may continue at operation 814 and the refinement module 140 may create a refinement that associates the initial query with a property of an item associated with the user event. The refinement module 140 may update a record in a table of refinements, where the record includes the query, the item property, and a score. The refinement module 140 may, at operation 816, rank search results for a subsequent query based on the associated refinements indicated in the records of the table.

In one example embodiment, the query module 120 may store received queries in a user session and the refinement module 140 may create the refinement in response to receiving a user event. For example, in response to the user selecting an item for viewing, the refinement module 140 may create the refinement based, at least in part, on previous queries received in the user session.

Figure 9:
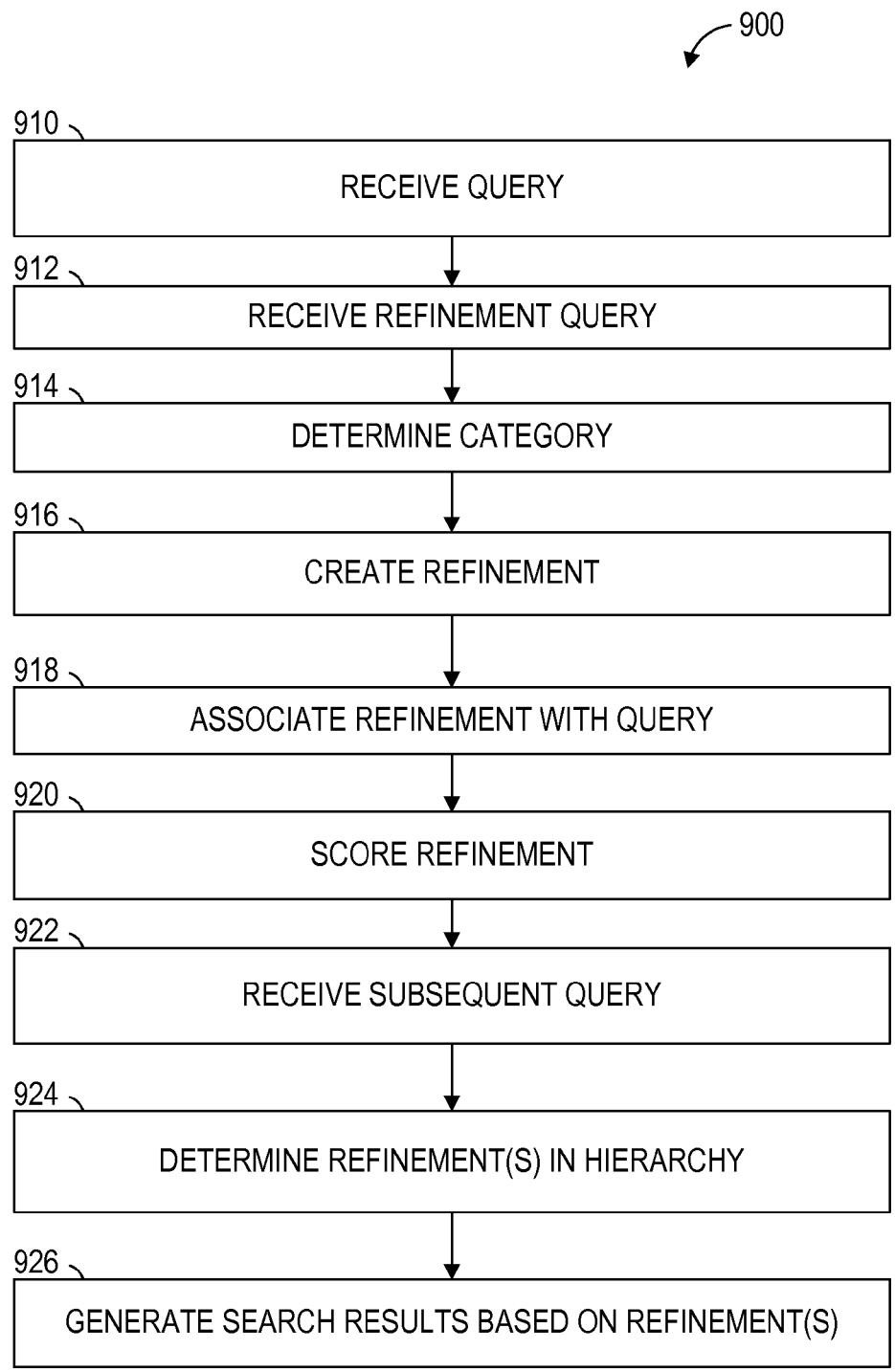
FIG. 9 is a block diagram illustrating a method for determining search results using session based refinements, in accordance with an example embodiment.

FIG. 9 is an illustration depicting a method 900 for determining search results using session based refinements, in accordance with an example embodiment. Operations in the method 900 may be performed by the system 100, using modules described above with respect to FIGS. 1-3. As shown in FIG. 9, the method 900 includes operations 910, 912, 914, 916, 918, 920, 922, 924, and 926.

In one embodiment, the method 900 may begin and at operation 910 the query module 120 may receive a query in a user session. The query may or may not be an initial query. The method 900 may continue at operation 912 and the query module 120 may receive an additional query as part of the user session as described herein. The additional query includes at least one of the search terms from the query and at least one additional search term.

The method 900 may continue at operation 914 and the refinement module 140 may determine a category for the refinement based on search terms in the refinement query. The method 900 may continue at operation 916 and the refinement module 140 may create the refinement that includes the query and the category. The refinement may further include the set of search terms in the refinement query. The method 900 may continue at operation 918 and the refinement module 140 may associated the query with the refinement in the hierarchy of refinements. The refinement module 140 may associate the refinement in the hierarchy of refinements by adding a child node in the hierarchy that is attached to a node for the query.

The method 900 may continue at operation 920 and the refinement module 140 may score the refinement as described herein. Scoring the refinement may include summing view counts for the query, summing sale counts for the query, combining view counts and sale counts in an equation (e.g., Eq. 1), or other operations, or other user events, or the like.

After the refinement module 140 scores the refinement, the method 900 may continue at operation 922 and the query module 120 may receive a subsequent query from the user, or from another user. The method 900 may continue at operation 924 and the query module 120 may determine a refinement for the query by traversing a hierarchy of refinements. For example, the query module 120 may determine a hierarchy to traverse based on a search term in the query.

For example, in response to the subsequent query including the search term "Harley," the query module 120 may traverse the hierarchy for the search term "Harley." Traversing a hierarchy may include beginning at a root node for the hierarchy and traversing child nodes until a matching search term is found. In response to finding another search term in a child node, the query module 120 may continue at that child node. When search terms have are no longer found in child nodes of the hierarchy, the query module 120 may generate search results for the subsequent query based on the refinement at the current node. Of course, the refinement may include a set of search terms and/or a category.

In another example embodiment, the query module 120 may begin at a root node for the hierarchy and may check child nodes for the child node with the highest score. The query module 120 may continue at that child node and again search for another child node with the highest score. In response to not finding a child node, the query module 120 may generate search results for the subsequent query based on the refinement at the current child node.

Figure 10:
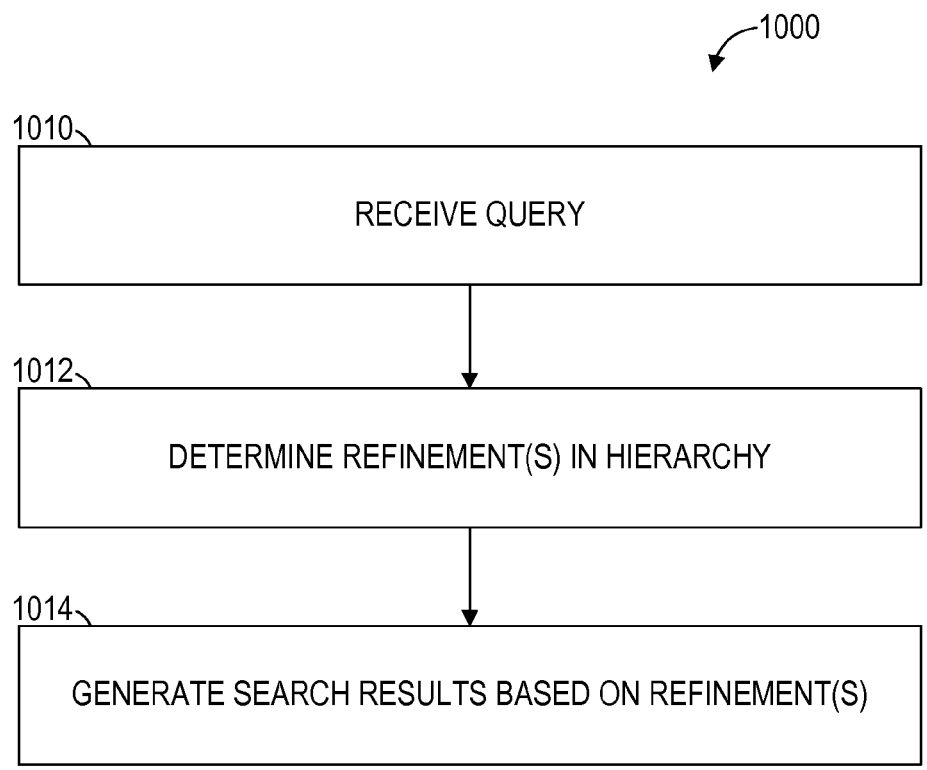
FIG. 10 is a block diagram illustrating a method for determining search results using session based refinements, in accordance with an example embodiment.

FIG. 10 is a block diagram illustrating a method 1000 for determining search results using session based refinements, in accordance with an example embodiment. Operations in the method 1000 may be performed by the system 100, using modules described above with respect to FIGS. 1-3. As shown in FIG. 10, the method 1000 includes operations 1010, 1012, and 1014.

In one example embodiment, the method 1000 may begin and the query module 120 may receive a query that includes one or more search terms in operation 1010. The method 1000 may continue at operation 1012 and the query module 120 may determine one or more refinement by at least partially traversing a hierarchy of refinements where the hierarchy of refinements includes stored refinements for many users. The method 1000 may continue at operation 1014 and the query module 120 may generate search results based on the determined refinements.

Figure 11:
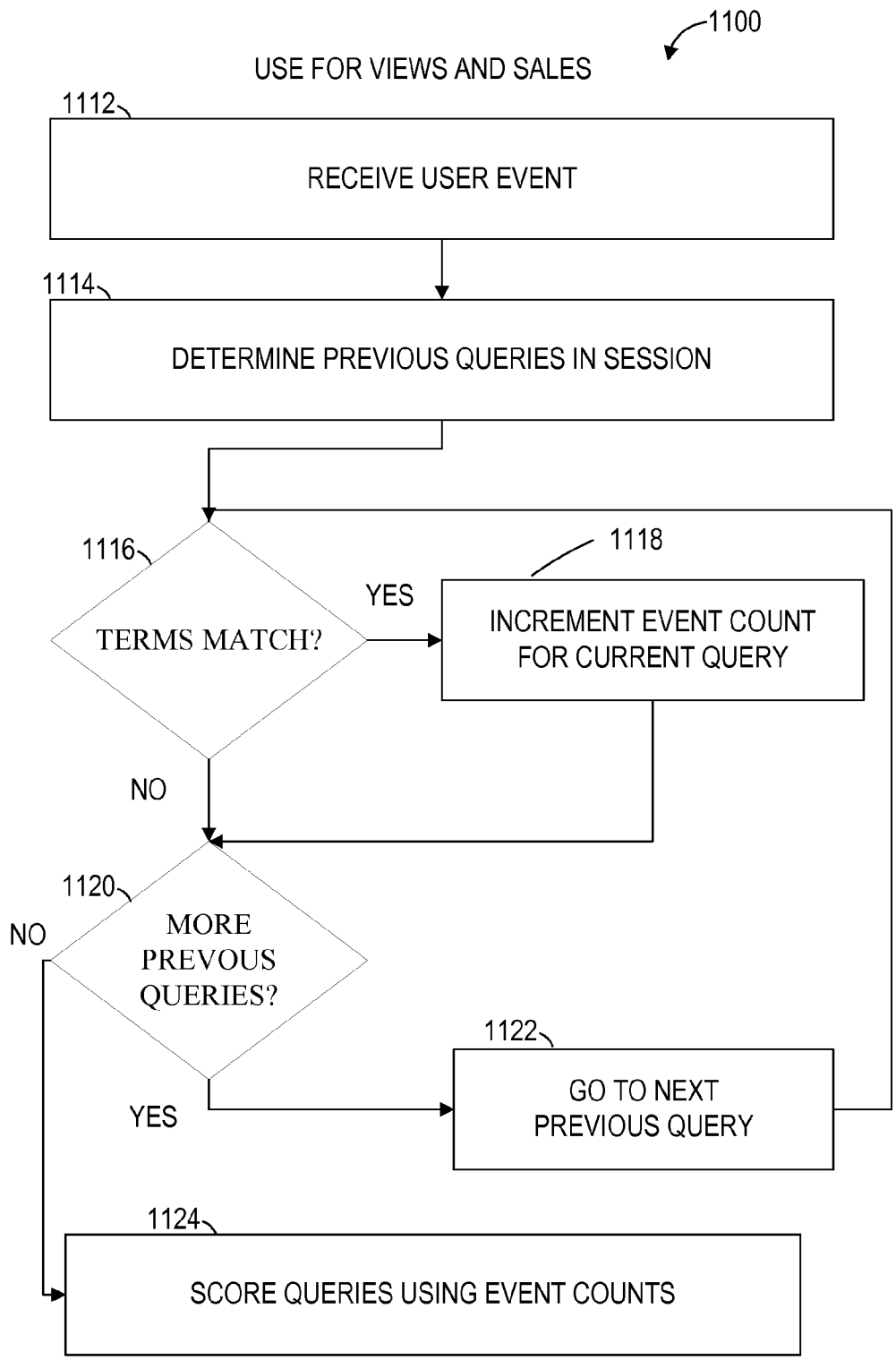
FIG. 11 is a block diagram illustrating a method for determining search results using session based refinements, in accordance with an example embodiment.

FIG. 11 is a block diagram illustrating a method 1100 for determining search results using session based refinements, in accordance with an example embodiment. Operations in the method 1100 may be performed by the system 100, using modules described above with respect to FIGS. 1-3. As shown in FIG. 11, the method 1100 includes operations 1112, 1114, 1116, 1118, 1120, 1122, and 1124.

In one embodiment, the method 1100 may begin, and at operation 1112, the query module 120 may receive a user event. A user event, as described herein, may include a user viewing an item, purchasing an item, placing an item on a watch list, or other, or the like. The method 1100 may continue at operation 1114 and the query module 120 may determine one or more previous queries occurring in the user session. Of course, the previous queries in the user session have been stored as one skilled in the art may appreciate. The query module 120 may iterate through previous queries, and for each previous query, the method 1100 may continue at operation 1116, where the query module 120 may determine whether one or more search terms match the most previous query.

In response to one or more search terms matching between the most recent query and a previous query, the method 1100 may continue at operation 1118 and the refinement module 140 may increment an event count for the previous query. In response to no search terms matching between the previous query and the most recent refinement query, the method 1100 may continue at operation 1120, and the query module 120 may determine whether there are additional previous queries to process. In response to there being additional previous queries to process, the method 1100 may proceed to the next pervious query at operation 1122 and continue at operation 1116.

Therefore, according to the disclosed method 1100, as the method 1100 is repeated in response to user events in the user session, a count of user events is constructed. In response to there being no additional previous queries to process, the method 1100 may continue at operation 1124 and the refinement module 140 may score each of the previous queries (e.g., refinement queries) in a hierarchy of refinements as previously described. The query module 120 may update the scores based on the user event counts using one or more equations as described herein.

Figure 12:
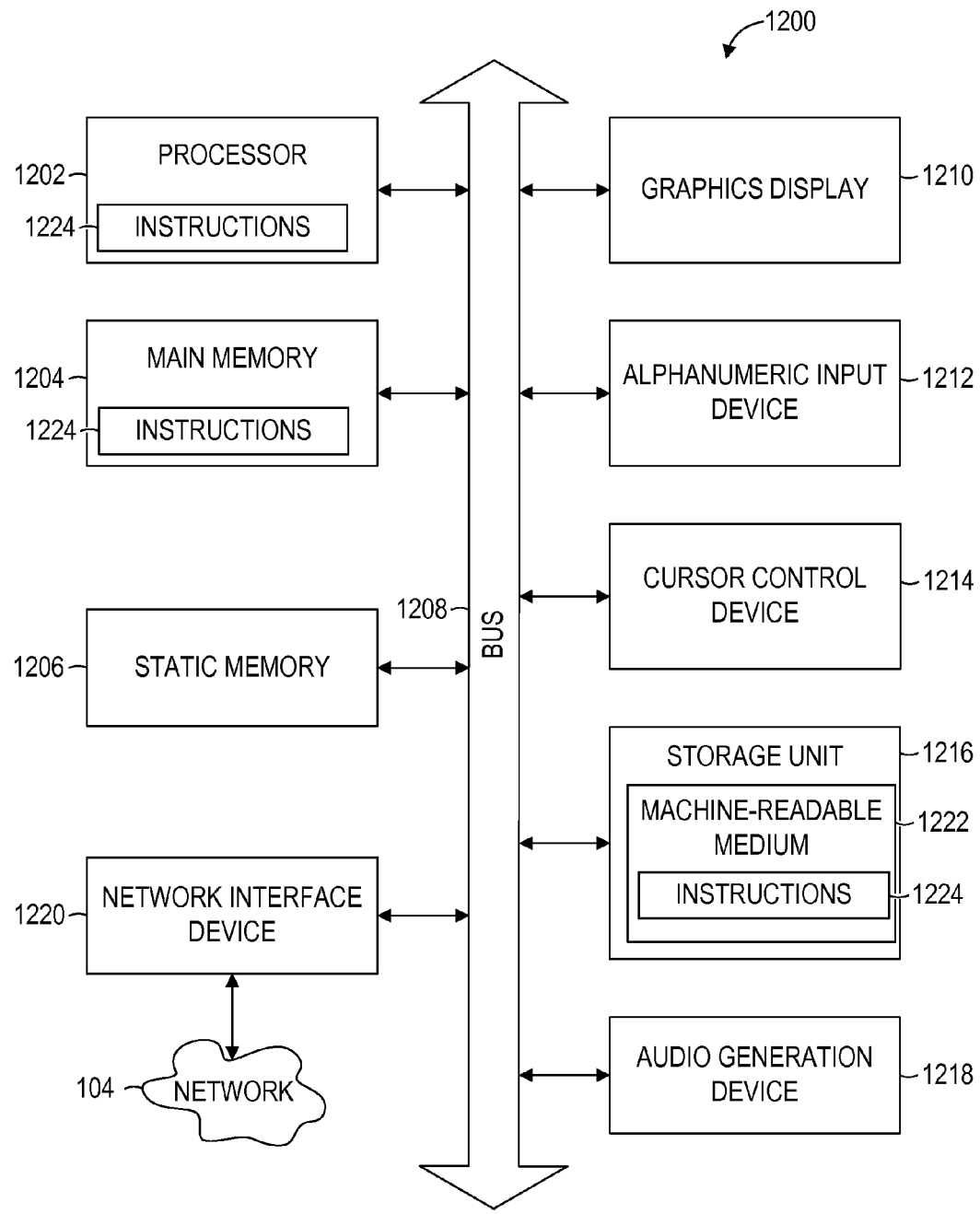
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions 1224 from a machine-readable medium 1222 (e.g., any of a non-transitory machine-readable medium, a machine-readable storage medium, a computer-readable storage medium, or any suitable combination thereof) and perform any one or more of the methodologies discussed herein, in whole or in part. Specifically, FIG. 12 shows the machine 1200 in the example form of a computer system (e.g., a computer) within which the instructions 1224 (e.g., software, a program, an application, an applet, an app, or other executable code) for causing the machine 1200 to perform any one or more of the methodologies discussed herein may be executed, in whole or in part. In one example embodiment, the query module 120 and the refinement module 140 may be included in the instructions 1224.

In alternative embodiments, the machine 1200 may operate as a standalone device or may be connected (e.g., networked) to other machines. The query module 120 and the refinement module 140 may operate via the machine 1200. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include any collection of machines that individually or jointly execute the instructions 1224 to perform all or part of any one or more of the methodologies discussed herein. Therefore, in certain embodiments, the various modules described herein may be executed on different machines operating as part of the system 100.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The processor 1202 may contain microcircuits that are configurable, temporarily or permanently, by some or all of the instructions 1224 such that the processor 1202 is configurable to perform any one or more of the methodologies described herein, in whole or in part. For example, a set of one or more microcircuits of the processor 1202 may be configurable to execute one or more modules (e.g., software modules) described herein.

In one example, the query module 120 may be operated by the processor 1202, and the query module 120 may store indicators, predefined indicators, retrieved indicators, or the like, in the main memory 1204 and/or static memory 1206. In another example, the query module 120 may communicate with client devices 110, 112 using the network interface device 1220.

The machine 1200 may further include a graphics display 1210 (e.g., a plasma display panel (PDP), a light emitting diode (LED) display, a liquid crystal display (LCD), a projector, a cathode ray tube (CRT), or any other display capable of displaying graphics or video). The machine 1200 may also include an alphanumeric input device 1212 (e.g., a keyboard or keypad), a cursor control device 1214 (e.g., a mouse, a touchpad, a trackball, a joystick, a motion sensor, an eye tracking device, or other pointing instrument), a storage unit 1216, an audio generation device 1218 (e.g., a sound card, an amplifier, a speaker, a headphone jack, or any suitable combination thereof), and a network interface device 1220. In certain embodiments, the query module 120 and/or the refinement module 140 may communicate with a remote database (e.g., database 320) via the network interface device 1220.

The storage unit 1216 includes the machine-readable medium 1222 on which are stored the instructions 1224 embodying any one or more of the methodologies or functions described herein. The instructions 1224 may also reside, completely or at least partially, within the main memory 1204, within the processor 1202 (e.g., within the processor's cache memory), or both, before or during execution thereof by the machine 1200. Accordingly, the main memory 1204 and the processor 1202 may be considered machine-readable media (e.g., tangible and non-transitory machine-readable media). The instructions 1224 may be transmitted or received over the network 104 via the network interface device 1220. For example, the network interface device 1220 may communicate the instructions 1224 using any one or more transfer protocols (e.g., hypertext transfer protocol (HTTP)).

In some example embodiments, the machine 1200 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non exclusive "or," unless specifically stated otherwise.

The invention claimed is:

1. A computer system comprising:
   a processor;
   a memory device holding an instruction set executable on the processor to cause the computer system to perform operations comprising:
   receiving a query in a user session, the query comprising one or more search parameters;
   detecting, in the user session and after receiving the query, a user event associated with an item in search results for the query;
   determining a property associated with the item in the search results;
   creating a refinement comprising an association between the property and the one or more search parameters, wherein refinements record hierarchical associations between properties of items and a corresponding one or more search parameters, and
   wherein the association between the property and the one or more search parameters is associated with a score that is updated based on a plurality of user actions, wherein the score is updated based on changing the score; and
   ranking search results for a subsequent query based on a plurality of refinements comprising the refinement.

2. The computer system of claim 1, wherein changing the score is based on increasing the score.

3. The computer system of claim 1, wherein the user event comprises at least one of adding the item to a watch list, viewing the item, selecting the item, purchasing the item, and adding the item to a cart.

4. The computer system of claim 1, wherein the property is selected from the group consisting of a brand, a color, a price, a price range, a category, a term in a title for the item, and a size.

5. The computer system of claim 1, wherein scores in a plurality of refinements comprising the refinement are represented as percentages such that the search results are selected in similar percentages.

6. The computer system of claim 1, wherein a first plurality of refinements comprising the refinement is stored separately from a second plurality of refinements, such that the first plurality of refinements is associated with a first class of users and the second plurality of refinements is associated with a second class of users.

7. A computer-implemented method comprising:
receiving a query in a user session, the query comprising one or more search parameters;
detecting, in the user session and after receiving the query, a user event associated with an item in search results for the query;
determining a property associated with the item in the search results;
creating a refinement comprising an association between the property and the one or more search parameters, wherein refinements record hierarchical associations between properties of items and a corresponding one or more search parameters, and
wherein the association between the property and the one or more search parameters is associated with a score that is updated based on a plurality of user actions, wherein the score is updated based on changing the score;
and
ranking search results for a subsequent query based on a plurality of refinements comprising the refinement.

8. The method of claim 7, wherein changing the score is based on increasing the score.

9. The method of claim 7, wherein the user event comprises at least one of adding the item to a watch list, viewing the item, selecting the item, purchasing the item, and adding the item to a cart.

10. The method of claim 7, wherein the property is selected from the group consisting of a brand, a color, a price, a price range, a category, a term in a title for the item, and a size.

11. The method of claim 7, wherein scores in a plurality of refinements comprising the refinement are represented as percentages such that the search results are selected in similar percentages.

12. The method of claim 7, wherein a first plurality of refinements comprising the refinement is stored separately from a second plurality of refinements, such that the first plurality of refinements is associated with a first class of users and the second plurality of refinements is associated with a second class of users.

13. A machine-readable medium storing executable instructions thereon, which, when executed by a processor, cause the processor to perform operations including:
receiving a query in a user session, the query comprising one or more search parameters;
detecting, in the user session and after receiving the query, a user event associated with an item in search results for the query;
determining a property associated with the item in the search results;
creating a refinement comprising an association between the property and the one or more search parameters, wherein refinements record hierarchical associations between properties of items and a corresponding one or more search parameters, and
wherein the association between the property and the one or more search parameters is associated with a score that is updated based on a plurality of user actions, wherein the score is updated based on changing the score; and
ranking search results for a subsequent query on a plurality of refinements comprising the refinement.

14. The machine-readable medium of claim 13, wherein changing the score is based on increasing the score.

15. The machine-readable medium of claim 13, wherein the user event comprises at least one of adding the item to a watch list, viewing the item, selecting the item, purchasing the item, and adding the item to a cart.

16. The machine-readable medium of claim 13, wherein the property is selected from the group consisting of a brand, a color, a price, a price range, a category, a term in a title for the item, and a size.

17. The machine-readable medium of claim 13, wherein scores in a plurality of refinements comprising the refinement are represented as percentages such that the search results are selected in similar percentages.

18. The machine-readable medium of claim 13, wherein a first plurality of refinements comprising the refinement is stored separately from a second plurality of refinements, such that the first plurality of refinements is associated with a first class of users and the second plurality of refinements is associated with a second class of users.

* * * * *